(12) United States Patent
Ambrosio et al.

(10) Patent No.: US 8,115,450 B2
(45) Date of Patent: *Feb. 14, 2012

(54) THERMALLY MANAGED BATTERY ENCLOSURE FOR ELECTRIC AND HYBRID ELECTRIC VEHICLES

(75) Inventors: Joseph Mario Ambrosio, Smithtown, NY (US); Konstantinos Sfakianos, Astoria, NY (US)

(73) Assignee: Odyne Systems, LLC, Waukesha, WI (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/284,612

(22) Filed: Sep. 23, 2008

(65) Prior Publication Data

US 2009/0068547 A1    Mar. 12, 2009

Related U.S. Application Data

(62) Division of application No. 11/312,803, filed on Dec. 20, 2005, now Pat. No. 7,427,156.

(60) Provisional application No. 60/637,712, filed on Dec. 20, 2004.

(51) Int. Cl.
*H02J 7/00*    (2006.01)
*H02J 7/14*    (2006.01)
*G01N 25/02*   (2006.01)
*H01M 2/10*    (2006.01)

(52) U.S. Cl. .......... 320/114; 320/104; 320/150; 374/20; 429/97; 429/98; 429/99

(58) Field of Classification Search .................... 320/114
See application file for complete search history.

(56) References Cited

U.S. PATENT DOCUMENTS

| | | | |
|---|---|---|---|
| 2,581,010 | A | 1/1952 | Findley et al. |
| 3,299,983 | A | 1/1967 | Hubbard |
| 3,923,115 | A | 12/1975 | Helling |
| 4,443,752 | A | 4/1984 | Newman |
| 4,918,690 | A | 4/1990 | Markkula, Jr. et al. |
| 4,941,143 | A | 7/1990 | Twitty et al. |
| 4,948,050 | A | 8/1990 | Picot |

(Continued)

FOREIGN PATENT DOCUMENTS

JP    09/163616    6/1997

(Continued)

OTHER PUBLICATIONS

Office Action for U.S. Appl. No. 11/329,018, mail date Oct. 14, 2008, 12 pages.

(Continued)

*Primary Examiner* — Yalkew Fantu
(74) *Attorney, Agent, or Firm* — Foley & Lardner LLP

(57) ABSTRACT

A thermally managed enclosure for batteries in a motor vehicle or other machinery includes a cradle of thermally conductive material for containing a battery. The cradle having a bottom wall and side walls closely fitted to and in contact with the battery, to maintain the battery in a stable position. The bottom wall of the cradle has a passageway trough containing a tube for flowing heating or cooling fluid therethrough, to control the optimal operating temperature of the battery. The passageway trough is preferably filled with a thermally conductive fill surrounding said tube. When two or more batteries are required, an array of adjacent cradles are provided in a monocoque tray formed by bonding or welding the multiple cradles at their adjacent sides. These cradles are optionally connected by linearly extending rods in the cradles.

30 Claims, 4 Drawing Sheets

U.S. PATENT DOCUMENTS

| | | | |
|---|---|---|---|
| 4,955,018 A | 9/1990 | Twitty et al. | |
| 4,959,962 A | 10/1990 | Hagin et al. | |
| 4,962,462 A | 10/1990 | Fekete | |
| 4,969,147 A | 11/1990 | Markkula, Jr. et al. | |
| 5,297,143 A | 3/1994 | Fridrich et al. | |
| 5,315,227 A | 5/1994 | Pierson et al. | |
| 5,319,641 A | 6/1994 | Fridrich et al. | |
| 5,366,827 A | 11/1994 | Belanger et al. | |
| 5,394,089 A | 2/1995 | Clegg | |
| 5,420,572 A | 5/1995 | Dolin, Jr. et al. | |
| 5,492,189 A | 2/1996 | Kriegler et al. | |
| 5,495,912 A | 3/1996 | Gray, Jr. et al. | |
| 5,500,852 A | 3/1996 | Riley | |
| 5,513,324 A | 4/1996 | Dolin, Jr. et al. | |
| 5,519,878 A | 5/1996 | Dolin, Jr. | |
| 5,568,037 A | 10/1996 | Massaroni et al. | |
| 5,569,552 A * | 10/1996 | Rao et al. | 429/72 |
| 5,620,057 A | 4/1997 | Klemen et al. | |
| 5,625,272 A | 4/1997 | Takahashi | |
| 5,635,805 A | 6/1997 | Ibaraki et al. | |
| 5,669,842 A | 9/1997 | Schmidt | |
| 5,701,068 A | 12/1997 | Baer et al. | |
| 5,866,276 A * | 2/1999 | Ogami et al. | 429/120 |
| 5,867,009 A | 2/1999 | Kiuchi et al. | |
| 5,923,093 A | 7/1999 | Tabata et al. | |
| 5,985,483 A * | 11/1999 | Verhoog et al. | 429/120 |
| 6,037,749 A | 3/2000 | Parsonage | |
| 6,042,961 A * | 3/2000 | Verhoog et al. | 429/72 |
| 6,048,288 A | 4/2000 | Tsujii et al. | |
| 6,057,050 A * | 5/2000 | Parise | 429/7 |
| 6,220,733 B1 | 4/2001 | Gordon | |
| 6,251,042 B1 | 6/2001 | Peterson et al. | |
| 6,269,895 B1 | 8/2001 | Tanuguchi et al. | |
| 6,316,841 B1 | 11/2001 | Weber | |
| 6,395,417 B1 | 5/2002 | Frazier | |
| 6,456,041 B1 | 9/2002 | Terada et al. | |
| 6,484,830 B1 | 11/2002 | Gruenwald et al. | |
| 6,524,743 B2 | 2/2003 | Vackar | |
| 6,590,363 B2 | 7/2003 | Teramoto | |
| 6,598,496 B2 | 7/2003 | Pannell | |
| 6,617,826 B2 | 9/2003 | Liao et al. | |
| 6,651,759 B1 | 11/2003 | Gruenwald et al. | |
| 6,653,002 B1 * | 11/2003 | Parise | 429/7 |
| 6,666,022 B1 | 12/2003 | Yoshimatsu et al. | |
| 6,705,416 B1 | 3/2004 | Gionner et al. | |
| 6,708,787 B2 | 3/2004 | Naruse et al. | |
| 6,719,080 B1 | 4/2004 | Gray, Jr. | |
| 6,725,581 B2 | 4/2004 | Naruse et al. | |
| 6,880,651 B2 | 4/2005 | Loh et al. | |
| 6,882,129 B2 | 4/2005 | Boskovitch et al. | |
| 6,922,990 B2 | 8/2005 | Naruse et al. | |
| 6,945,039 B2 | 9/2005 | Yoshino | |
| 6,945,893 B2 | 9/2005 | Grillo et al. | |
| 7,004,273 B1 | 2/2006 | Gruenwald et al. | |
| 7,086,226 B2 | 8/2006 | Oguri | |
| 7,104,920 B2 | 9/2006 | Beaty et al. | |
| 7,119,454 B1 | 10/2006 | Chiao | |
| 7,252,165 B1 | 8/2007 | Gruenwald et al. | |
| 7,273,122 B2 | 9/2007 | Rose | |
| 7,375,492 B2 | 5/2008 | Calhoon et al. | |
| 2001/0035740 A1 | 11/2001 | Palanisamy | |
| 2002/0028376 A1 | 3/2002 | Yamane et al. | |
| 2002/0108794 A1 | 8/2002 | Wakashiro et al. | |
| 2004/0108831 A1 | 6/2004 | Cartwright et al. | |
| 2005/0012337 A1 | 1/2005 | Yoshimatsu | |
| 2005/0167169 A1 | 8/2005 | Gering et al. | |
| 2005/0202315 A1 | 9/2005 | Sugeno et al. | |
| 2005/0271934 A1 | 12/2005 | Kiger et al. | |
| 2006/0116797 A1 | 6/2006 | Moran | |
| 2007/0096667 A1 | 5/2007 | Komiyama et al. | |
| 2007/0124037 A1 | 5/2007 | Moran | |
| 2007/0227801 A1 | 10/2007 | Loeffler | |
| 2008/0093864 A1 | 4/2008 | Kagoshima et al. | |
| 2009/0018716 A1 | 1/2009 | Ambrosio | |
| 2009/0095549 A1 | 4/2009 | Dalum et al. | |
| 2009/0236156 A1 | 9/2009 | Promersberger et al. | |

FOREIGN PATENT DOCUMENTS

| | | | |
|---|---|---|---|
| JP | 2001/008309 A | | 1/2001 |
| WO | WO 2009/009078 A1 | | 1/2009 |

OTHER PUBLICATIONS

Office Action for U.S. Appl. No. 11/329,018, mail date Jun. 25, 2009, 16 pages.

Office Action for U.S. Appl. No. 11/329,018, mail date Dec. 18, 2008, 13 pages.

International Search Report and Written Opinion for International Application No. PCT/US2009/037664, dated Aug. 3, 2009, 6 pages.

U.S. Appl. No. 60/959,181, filed Jul. 12, 2007, Odyne Corporation.

AZD, Azure Dynamics, Electric Drive Solutions, AZD Force Drive, We drive a World of difference; available at least by May 30, 2008; 2 pages.

AZD, Azure Dynamics, Force Drive Electric Solutions, Force Drive Electric Vehicles Zero Emissions, website: http://www.azuredynamics.com/products/force-drive/traction-motors.htm; © 2008 Azure Dynamics Inc.; 2 pages.

AZD, Azure Dynamics, LEEP, Low Emission Electric Power System, AZD has one of the largest hybrid technology engineering teams in the world; available at least by May 30, 2008; 2 pages.

AZD, Azure Dynamics, Parallel Hybrid Electric Ford E450 Cutaway and Strip Chassis, available at least by May 30, 2008; 2 pages.

AZD, Azure Dynamics, Series Hybrid Electric Azure CitiBus, Our drive can make your difference; available at least by May 30, 2008; 2 pages.

Balance Hybrid Electric E450 Drive System Hybrid Trucks, © 2008 Azure Dynamics Inc.; website http://www.azuredynamics.com/products/balance-hybrid-electric.htm; 2 pages.

Blanco, S., "Odyne, Dueco will build PHV aerial lift truck," website: http://autobloggreen.com/2007/05/07/odyne-dueco-will-build-phev-aerial-lift-truck/, accessed on Jan. 3, 2009, 6 pgs.

Business Wire, Odyne Corp. Receives order for Twenty-five plug-in hybrid systems from Dueco, Inc., website: http://www.businesswire.com/portal/site/home/index.jsp?epi_menuItemID=887566059a3ae..., accessed on Jan. 3, 2008, 3 pgs.

CitiBus Hybrid Electric StarTrans, CitiBus HD Senator; © 2008 Azure Dynamics Inc.; website: http://www.azuredynamics.com/products/citibus-hybrid-electric.htm; 2 pages.

Dueco, Hybrid Vehicle, TL50M Dueco's Plug-In Hybrid Electric Vehicle (PHEV); available at least by May 30, 2008; 1 page.

Dueco/Odyne Corporation, Partners in Green Technology for the Utility Industry, Hybrid Power, PHEV-Diesel Electric; available at least by May 30, 2008; website: www.dueco.com; 1 page.

Eaton, Freightliner® LLC, Daimler Chrysler Truck Group, M2 "Proof of Concept" HEV Utility Truck Specs; available at least by May 30, 2008; 2 pages.

Eaton, Hybrid Power Systems, Roadranger®, Eaton's Medium-Duty Hybrid Electric System provides up to 60% fuel savings and significantly reduces emissions as compared to a conventional drivetrain.*; © 2006 Eaton Corporation; website at www.roadranger.com.; 2 pages.

Green Car Congress, "Nissan Adds Diesel Hybrid and CNG Models to Atlas H43 Lineup," website: http://www.greencarcongress.com/2007/09/nissan-adds-die.html; accessed on Jun. 23, 2009, 2 pgs.

Hodges, Susan L., Is There a Hybrid in Your Future?; website: http://www.lmtruck.com/articles/petemplate.aspx?storyid=116; accessed on Jun. 6, 2008; 6 pages.

Hybrid Electric Vehicles LEEP Systems/Azure Dynamics; LEEP Systems/Freeze/Lift; © 2008 Azure Dynamics Inc.; website: http://www.azuredynamics.com/products/leep-system.htm; 2 pages.

HyPower by Terex, "Low Carbon Footprint, Plug-In Power Hybrid System," Copyright © 2009 Terex Corporation, 2 pgs.

International Search Report and Written Opinion for International Appl. No. PCT/US2008/079376, mail date Apr. 9, 2009, 9 pgs.

International Search Report and Written Opinion for International Appl. No. PCT/US08/08442, mail date Sep. 26, 2008, 7 pgs.

Isuzu, "Introduction of ELF Diesel Hybrid," website: http://www.isuzu.co.jp/world/technology/randd/project6/01.html; accessed on Nov. 1, 2007, 2 pgs.

Isuzu; "Low Pollution Alternative Fuel Vehicles," website: http://www.isuzu.co.jp/world/technology/low/index.html, accessed on Jun. 22, 2009, 3 pgs.

Ogando, Joseph; Hydraulic Powertrains Propel These Hybrid Trucks; website: http://www.designnews.com/article/CA6451735.html?nid=2874#_self; Design News, Jun. 13, 2007; 5 pgs.

Palumbo, Anthony J.; Bloomfield, Aaron, Major, Jeff; "Ultracapacitor Based Hybrid Booster Drive®"; Original Aug. 2003 (Revised Jun. 2004); 16 pages.

Powderly II, H.E., Long Island Business News, "Odyne to ship 25 plug-in systems to Dueco Inc.," dated Dec. 20, 2007, website: http://www.libn.com/breakingnews.htm?articleID=9497 accessed on Jan. 3, 2008, 2 pgs.

ThomasNet, "Aerial lift truck delivers plug-in hybrid functionality," website: http://news.thomasnet.com/fullstory/535299, accessed on Jan. 3, 2008, 4 pgs.

Vasilash, G., "Power Trains 2005, Hybrid Powertrains: The Two-Mode Approach," website: http://www.autofieldguide.com/articles/article_print1.cfm, accessed on Jun. 24, 2009, 3 pgs.

Vehicle Technology.org, Advanced GM Allison Two-Mode Parallel Hybrid Technology Ready for Europe; website: http://www.vehicletecnology.org/vt2007/36.html; accessed on Jun. 6, 2008; 3 pages.

Vehicle Technology.org, Advanced Gm Allison Two-Mode Parallel Hybrid Technology Ready for Europe; website: http://www.vehicletecnology.org/vt2007/37.html; accessed on Jun. 6, 2008; 3 pages.

Vehicle Technology.org, Advanced GM Allison Two-Mode Parallel Hybrid Technology Ready for Europe; Energy storage system (ESS); website: http://www.vehicletecnology.org/vt2007/38.html; accessed on Jun. 6, 2008; 3 pages.

Notice of Allowance for U.S. Appl. No. 11/329,018, mail date Jun. 25, 2010, 7 pages.

International Search Report and Written Opinion for International Appl. No. PCT/US2009/066151 dated Jul. 15, 2010, 10 pages.

\* cited by examiner

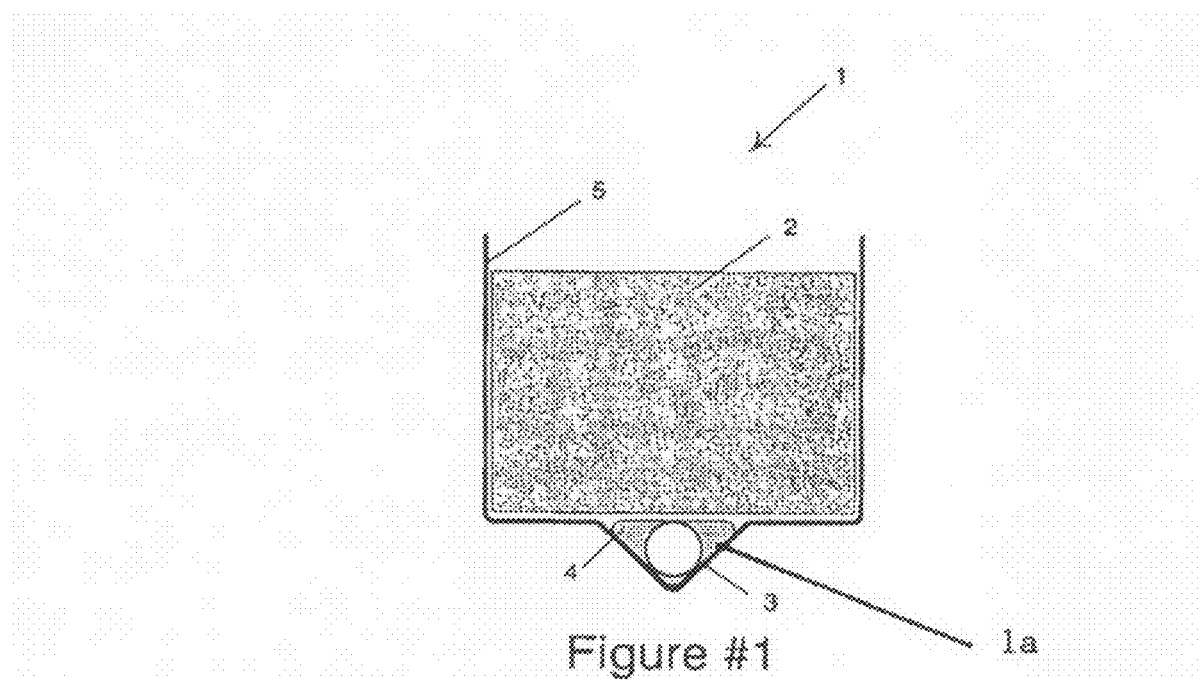
Figure #1
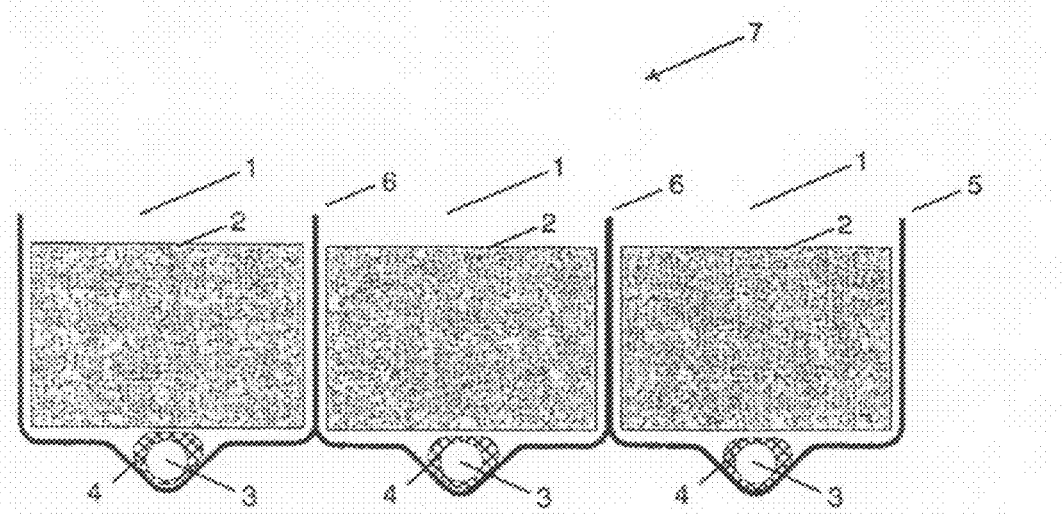
Figure #2

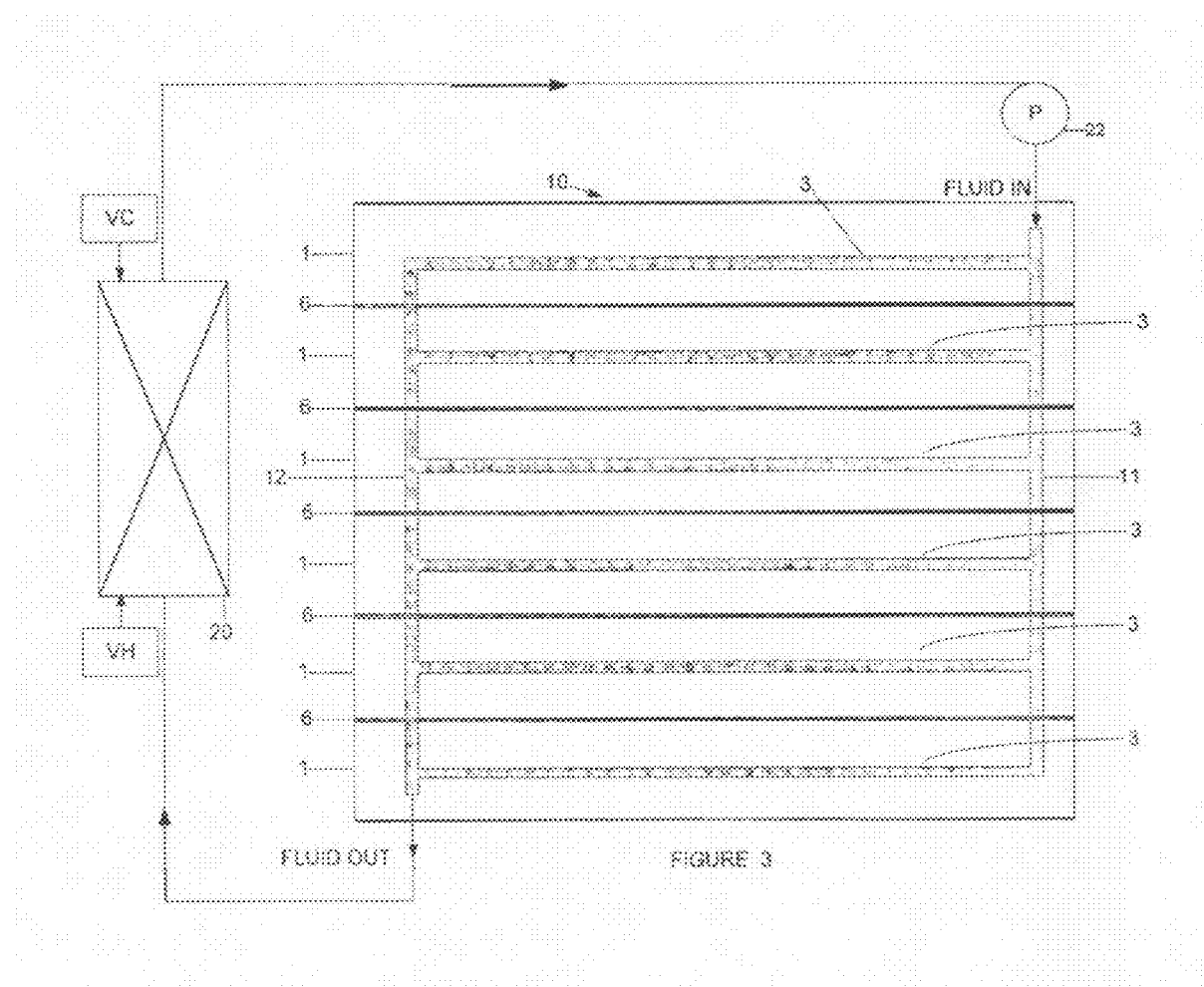

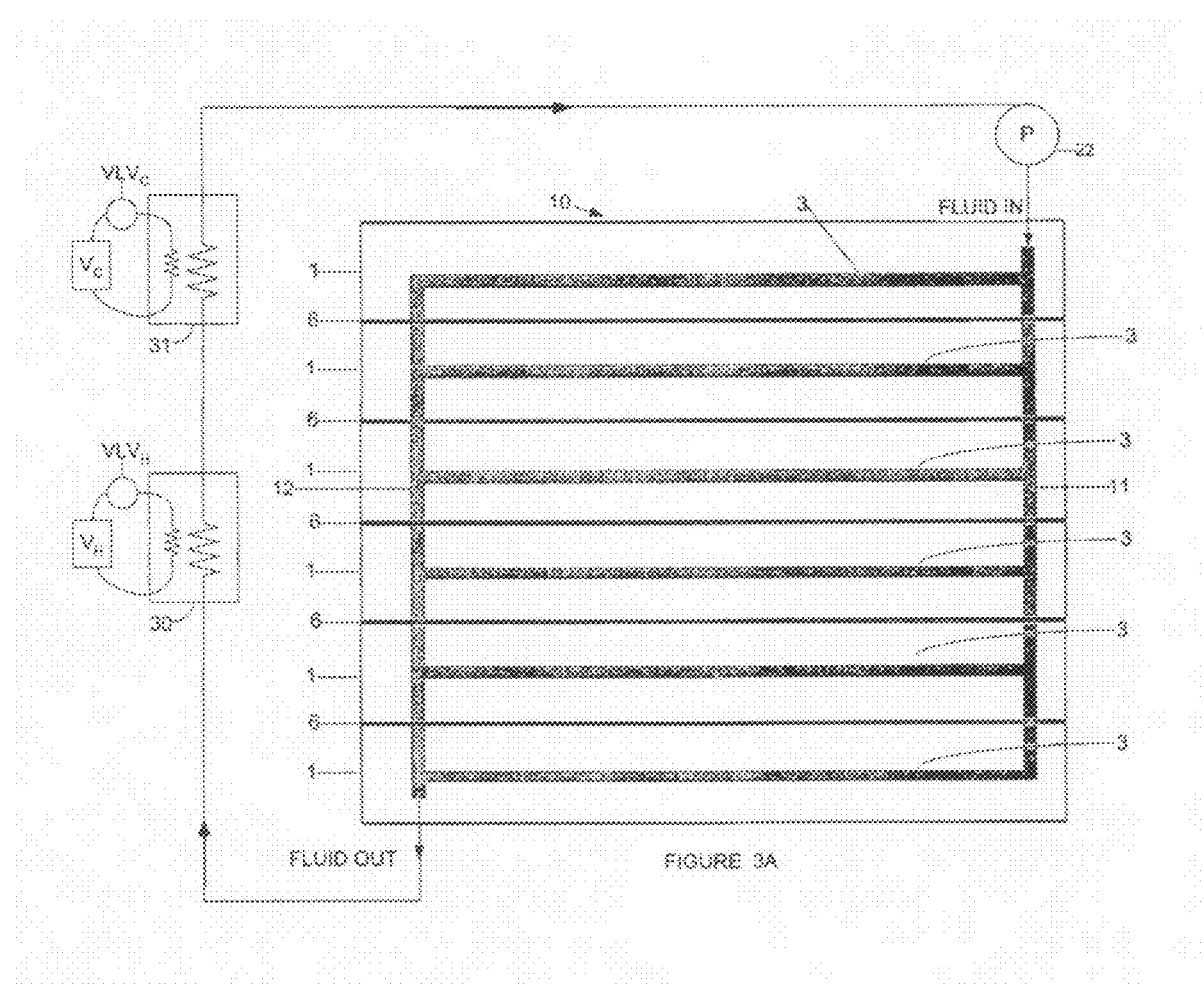

THERMALLY MANAGED BATTERY ENCLOSURE FOR ELECTRIC AND HYBRID ELECTRIC VEHICLES

CROSS REFERENCE TO RELATED APPLICATIONS

This application claims the benefit, Under 35 U.S.C. 119 (e) of U.S. Provisional Application No. 60/637,712, filed Dec. 20, 2004, which is hereby incorporated by reference. This application is a divisional of application Ser. No. 11/312,803, filed Dec. 20, 2005 now U.S. Pat. No. 7,427,156 and claims priority under 35 U.S.C. 120 therefrom, which application is incorporated by reference herein.

FIELD OF THE INVENTION

The present invention relates to thermally managed battery enclosure for electric and hybrid electric vehicles.

BACKGROUND OF THE INVENTION

The present invention is directed to electric and hybrid electric off-road and on-road vehicles, which use solely a battery pack or a battery and electric generating system to supply energy for propulsion. Such battery packs include multiple battery modules connected in series or parallel. The invention addresses a variety of environmental and technical challenges associated with reliable and long-term battery operation. Vehicles utilizing the invention include electric and hybrid electric buses, trucks, material handling vehicles (forklifts and pallet jacks), neighborhood electric vehicles, and airport support equipment.

OBJECTS OF THE INVENTION

It is an object of the present invention to provide a thermally managed battery enclosure for vehicles and machinery which protects the battery and provides a conductive path for battery heating and cooling for optimal battery performance.

It is also an object of the present invention to maintain a battery at a selected temperature, to regulate the temperature of the battery for optimal performance.

It is further an object to provide a battery enclosure with a heat exchanger for obtaining heat from engine coolant in a vehicle.

It is also an object to provide a structurally sound vehicle battery enclosure which keeps the battery in safely in place.

It is also an object to improve over the disadvantages of the prior art.

Other objects which become apparent from the following description of the present invention.

SUMMARY OF THE INVENTION

In keeping with these objects and others which may become apparent, the present invention is a battery enclosure with a unitized structural skin design (also called monocoque), which encloses the battery from the environment, provides structure, and provides a conductive path for battery heating/cooling as required for optimum battery performance. The battery is heated and/or cooled based on ambient environmental conditions and/or battery temperature conditions such as hot batteries resulting from internal battery resistance or cold batteries resulting from low ambient temperatures.

The aforesaid battery enclosure addresses the following issues:
- Protection from the environment (water, humidity, road debris, etc.);
- Battery heating in cold weather;
- Battery cooling in hot weather;
- Location and supporting structure within vehicle;
- Maintaining a low temperature differential from battery to battery within the battery tray; and,
- Creating a safe and isolated method to integrate and handle a large number of batteries.

The battery enclosure includes a plurality of long cradles constructed of a thermally conductive material, such as aluminum, which are formed to the shape of the battery in order to maximize surface contact with each of the battery's outer surfaces. The battery cradles are shaped and sized based on the battery type and the vehicle configuration. Each cradle is equipped with a passage for a fluid loop, which is the working fluid. The working fluid is heated or cooled (by external means) in order to maintain the battery at its optimum operating temperature.

The working fluid is usually a water-glycol solution and is chilled by tapping into the vehicle air-conditioning system via a coolant-to-liquid heat exchanger; typically the coolant is a type of Freon®. In a motor vehicle environment, the onboard battery management system controls this by engaging the air-conditioning system and appropriate working fluid pumps prior to battery charging. The idea is to thermally correct the batteries before charging begins. This can be engaged during driving under extreme conditions as well. Fluid can be conditioned by external means as well, not only by use of an air conditioner and/or engine coolant. For example, an external chiller and/or heater can be used to condition the glycol working fluid. The working fluid may be either a liquid or a gas, such liquid glycol solutions, for example, ethylene glycol or other alcohols containing two hydroxyl groups, or gaseous or liquid fluorinated hydrocarbons used as working fluids in refrigeration and air conditioning, such as Freon®, for example, as the working fluid. The contact surface is the battery enclosure and the transfer media, which makes more surface contact than just the fluid; it is a solid (i.e. the cradle conditioned by the working fluid).

The working fluid can also be heated by an on board electric heater or using waste heat from other vehicle systems (such as an auxiliary power unit). If the batteries are too cold to charge, the battery management system would engage the electric heater and appropriate fluid pumps to thermally correct the batteries prior to charging for efficient charging. The lower the battery temperature the less efficient the charging. At some temperature the battery cannot be charged at all.

The cradles are assembled into a unitized monocoque tray structure by welding or otherwise fastening each cradle to each other. The working fluid is carried by a conduit, such as a pipe, usually copper, which sits adjacent to the cradle, such as, for example, on the bottom of each cradle within a passageway trough, which may be, for example, a "V" shape trough created within the cradle or other configuration adjacent to a wall of the cradle. Other methods of fluid flow and introduction can be used, other than the V-shape trough at the bottom of a cradle, such as are known to those skilled in the art. For example, a tube can be attached by welding or otherwise in areas other than the bottom of the cradle, or it can be attached by sliding an extrusion on, etc. The conduit, such as a pipe, is preferably installed with thermally conductive potting materials or epoxies. This keeps the conduits, such as pipes, in place while creating a thermal path to the cradles. Although other interconnecting configurations are applicable, preferably each of the conduits, such as pipes, within the cradles are preferably interconnected through a manifold system by connecting the conduits, such as pipes, in parallel. By keeping the cradles bonded to each other and by pumping the working fluid the entire tray is at approximately the same temperature. The cradles are assembled into a unitized tray structure through a bonding process appropriate to the materials used (i.e. welding for metals, adhesives for non-metals) to create the described battery enclosure having the appropriate voltage and amp-hour capacity for a specific vehicle's requirements.

Each cradle is preferably designed to stay secure in place, such as, for example being provided with a fastener means, such as a hole for every battery at the top, which is just above the battery cover. When all the cradles are assembled, the holes of each cradle are in line allowing for a fastener, such as a rod to pass through. This prevents the batteries from moving or falling off the trays in the event of a vehicle flip over. This also adds to the structural strength of the complete tray. By keeping the rod fit tight, it makes the batteries part of the structure.

In general, the thermally managed enclosure for batteries of the present invention includes one or more cradles of thermally conductive material, each cradle containing one or more batteries. Each cradle preferably has a bottom wall and side walls which are closely fitted to, and in intimate contact with, the batteries contained therein, and each cradle is in contact with its respective batteries. The bottom wall of each cradle includes a passageway trough containing a tube or pipe for flowing heating or cooling fluid, such as, for example, a liquid therethrough.

Each passageway trough is filled with a thermally conductive fill surrounding each respective fluid-filled tube or pipe.

The thermally managed enclosure may include multiple cradles for batteries, wherein one or more batteries occupies a single cradle.

When multiple cradles are implemented, the thermally managed enclosure provides the cradles in a side by side configuration, with a fluid pipe in the bottom wall of each cradle. Each fluid pipe is preferably positioned in parallel with an adjacent fluid pipe, and adjacent batteries are bonded at their respective common side walls.

In the thermally managed system for one or more batteries, there is provided a series of passageways, each containing the tube within which flows heating or cooling fluid, such as a liquid. Each respective passageway trough is filled with a thermally conductive fill surrounding each tube.

Temperature of the flowing liquid is controlled to maintain each battery at a selected temperature by a first heat exchanger, which preferably obtains heat from engine coolant in the vehicle having the battery or batteries therein.

Optionally, the battery enclosure may have a second heat exchanger to cool the liquid, by using refrigerant in an air conditioning system of the vehicle.

The battery enclosure preferably controls the selection of the appropriate heat exchanger in accordance with temperature requirements of each respective battery.

Structurally, the battery enclosure is configured to prevent each battery from leaving its respective cradle in the event of an accident involving the vehicle having the battery or batteries. When multiple battery cradles are provided, they may optionally be interconnected with rods or other connectors extending through the walls of the battery enclosure.

The thermally managed enclosure preferably includes an intake manifold carrying heating or cooling fluid to the fluid pipes in each passageway trough of each cradle, then out through an outlet manifold and then on through respective external heat exchangers and pumps in the vehicle, to form a closed loop heating/cooling system for the batteries in the thermally managed enclosure.

While the preferred embodiment includes the fluid filled tube in a passageway trough at the bottom of the cradle having side walls, it is noted that the cradle may be of any geometric configuration, even with one or more curved walls, so long as the adjacent fluid filled passageway trough is in intimate contact with a wall of the respective cradle.

In operation of a preferred embodiment, the temperature of a battery in a powered motor vehicle is controlled by:

a) securing the battery within a respective cradle in the vehicle, wherein the cradle has walls and a bottom region of thermally conductive material, with a bottom wall of the cradle having a passageway trough containing a tube;

b) flowing heating or cooling liquid through the tube at a temperature to regulate the temperature of the respective battery;

c) heating the liquid as required by exchanging heat with engine coolant or other source in the vehicle;

e) cooling the liquid as required by exchanging heat with refrigerant in an air conditioning system on board the vehicle; and f) controlling the heating and cooling of the liquid in a closed loop, in accordance with the temperature requirements of the respective battery.

When multiple batteries are used, there are either placed adjacent to one another in a single cradle, or placed in multiple cradles of one or more batteries.

BRIEF DESCRIPTION OF THE DRAWINGS

The present invention can best be understood in connection with the accompanying drawings. It is noted that the invention is not limited to the precise embodiments shown in drawings, in which:

FIG. 1 is an end view of a single battery-width cradle showing the fluid tube for thermal management;

FIG. 2 is an end view of three battery cradles of FIG. 1 bonded together to form a three battery-width tray;

FIG. 3 is a top plan view of an unpopulated multi-battery tray showing the location of fluid manifolds and battery cradle fluid tubes, and, FIG. 3A is a top plan view of an alternate embodiment for an unpopulated multi-battery tray showing the location of fluid manifolds and battery cradle fluid tubes, and, FIG. 4 is a top plan view of the battery cradle of FIG. 3 populated with an array of batteries.

DETAILED DESCRIPTION OF THE PREFERRED EMBODIMENT

Figure 4:
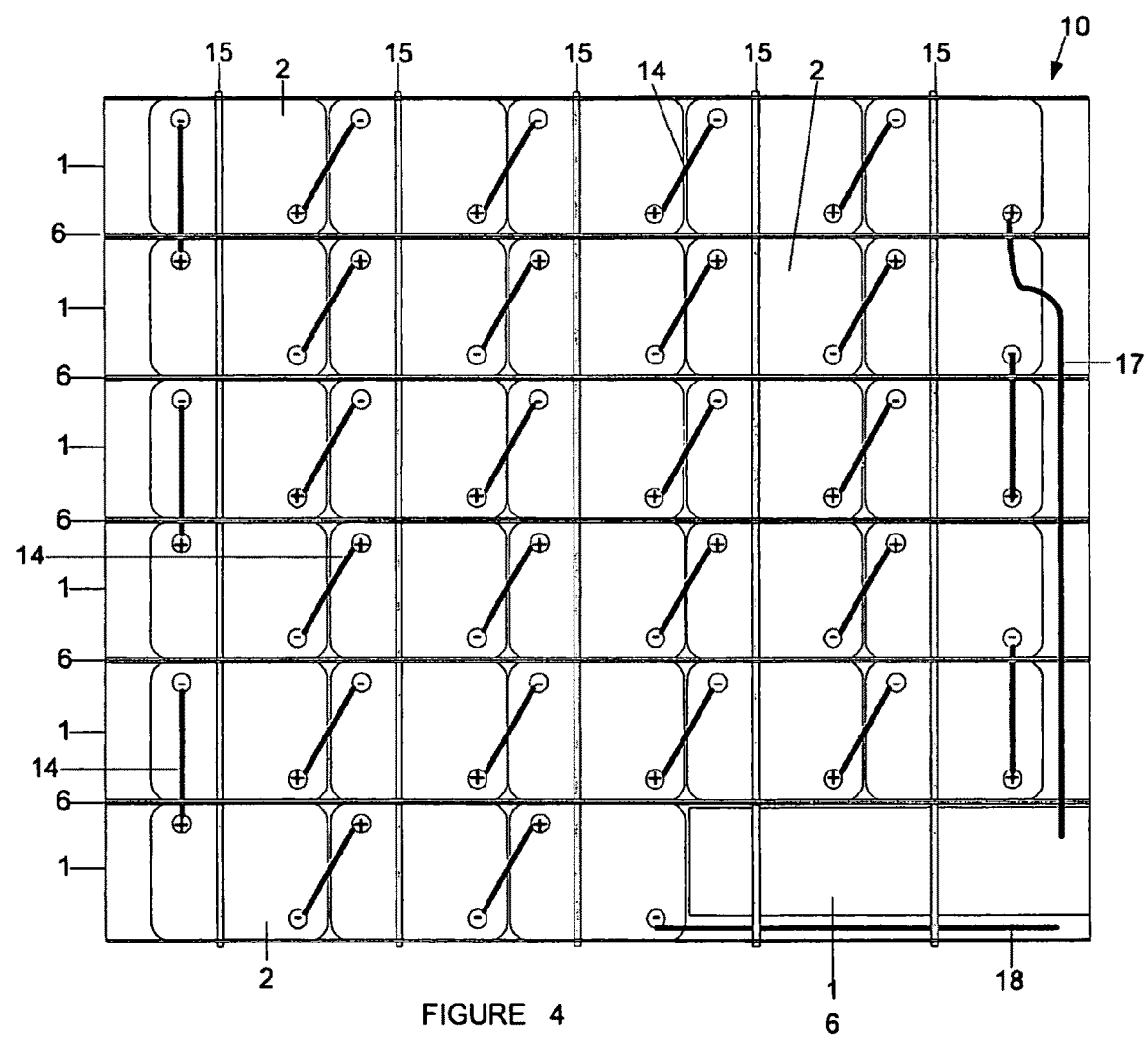

FIG. 1 is an illustration of a single battery cradle 1. The cradles are heated and cooled via an integral fluid loop. The battery cradle 1 has been designed to accommodate a fluid loop. Each cradle 1 has a lower pocket trough 1a, which supports the placement of tubing 3. The tubing 3 is adhered to the battery cradle 1 in order to maximize thermal conductivity under cooling or heating conditions. The cradle shape, size, and material are based on the battery type (i.e. Pb-Acid, NiMH, Li-based batteries, etc).

FIG. 2 is an illustration of multiple cradles 1 being used in a multi-battery configuration. As described, multiple cradles 1 are bonded together to form a battery tray 7 having multiple batteries 2. Another object of the invention is the method of adhesion to facilitate thermal equalization between all batteries 2 within an individual cradle 1 or set of cradles 1 forming a tray 7.

With specific attention to the drawings, FIG. 1 is an end view of a single battery-width cradle 1 with form-fitting housing 5 which closely fits around batteries 2. Fluid tube 3 carries the pumped working fluid (typically water-glycol solution, although any heat exchanging gas or liquid may be employed) to heat or cool batteries 2. A thermally conductive fill 4 around tube 3 in a lower pocket trough 1a insures efficient heat transfer in either direction to batteries 2.

FIG. 2 shows an end view of three single-width cradles 1 bonded together at adjacent walls 6 to form a three battery-width tray 7.

FIG. 3 is a top view of a battery tray with six cradles 1 bonded together at five adjacent walls 6 to form battery tray 10. This illustration is not populated with batteries, but the layout of the fluid conduits is shown. Intake manifold 11 carries thermally conditioned working fluid to fluid tubes 3 in each trough 1a of each cradle 1 and then out through outlet manifold 12 and then on through one or more sets of external heat exchangers 20 and pumps 22 connected to either the vehicle's heating system VH and/or the vehicle's cooling system VC, to form a closed loop heating/cooling system for the batteries 2.

FIG. 3A is a top view of a battery tray with six cradles 1 bonded together at five adjacent walls 6 to form battery tray 10. This illustration is also not populated with batteries, but the layout of the fluid conduits is shown. Intake manifold 11 carries thermally conditioned working fluid to fluid tubes 3 in each trough 1a of each cradle 1 and then out through outlet manifold 12 and then on through two heat exchangers 30 and 31 in series. External heat exchanger 30 is for heating and external heat exchanger 31 is for cooling. Heat exchanger 30 is selectively coupled with vehicle heating system VH, via electrically operated valve (or circulator) VLVH. Heat exchanger 31 is selectively coupled with vehicle air conditioner system VC via electrically operated valve (or circulator) VLVC.

Further with respect to FIG. 3A, only one valve VLVH or VLVC is opened at any one time for heating or cooling respectively. If the respective valve VLVH or VLVC is not selected, then the main loop flow though that unselected heat exchanger does not appreciably the affect the temperature of the fluid. In other words, the main loop goes through both heat exchangers at any time, but if the valve for one of the heat exchangers is closed, then only one of the valves, either valve VLVH or VLVC, is open. After the heat exchange, then fluid is pumped by pump 22 to the battery enclosure, to form a closed loop heating/cooling system for the batteries 2. FIG. 4 is a top view of tray 10 as populated with 28 batteries 2. They are wired via jumpers 14 into a series connection with interface power cables 17 (+) and 18 (−). Obviously any parallel or series/parallel connections can be supported by battery tray 10; the series connection shown is simply an illustration of one possible configuration. Note that there is space for thirty batteries 2 in tray 10 but only 28 are required. Two-battery space filler 16 is introduced to keep batteries 2 from shifting. In other battery trays with different battery population requirements, one or more spacers of a variety of sizes (in multiples of unit battery size) might be incorporated. The side walls of housings 5 of battery cradles 1 are perforated with holes which are aligned in registration when assembled into trays such as 10. These are used to accommodate locking rods 15 which secure the top of each battery 2 to tray 10. This prevents batteries 2 from falling out of tray 10 even in the event of a vehicle roll-over.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A thermally managed enclosure for at least one battery comprising:
   a) at least one cradle of thermally conductive material for containing at least one battery;
   b) said at least one cradle having a bottom wall and side walls closely fitted to and in contact with said at least one battery, wherein said side walls comprise a first set of parallel side walls and a second set of parallel side walls, said second set of side walls being of greater length than that of the first set;
   c) the bottom wall of said at least one cradle having a passageway trough formed below said bottom wall, said bottom wall forming a top wall of said passageway containing a pipe for flowing heating or cooling fluid;
   d) said passageway trough being filled with a thermally conductive fill surrounding said pipe;
   e) said passageway trough being parallel to said second set of side walls; and
   wherein the sidewalls having one or more apertures configured to receive one or more fasteners for securing the at least one battery to said battery enclosure.

2. The thermally managed enclosure of claim 1 having a plurality of multiple cradles for batteries, and at least one battery occupying a single cradle of each of said plurality of multiple cradles; wherein said one or more apertures are aligned in registration when assembled, said apertures being used to accommodate respective locking rods securing a respective top of each said battery to said battery enclosure.

3. The thermally managed enclosure of claim 2 wherein said battery enclosure is in the form of a monocoque battery tray formed by at least one of bonding or welding said multiple cradles at their adjacent sides.

4. The thermally managed enclosure of claim 2 in which said cradles are positioned side by side with fluid pipes adjacent cradles parallel to each other.

5. The thermally managed system for at least one battery as in claim 1 further comprising a means for controlling the temperature of said fluid to maintain said battery at a selected temperature.

6. The thermally managed enclosure of claim 5 wherein said means for controlling the temperature of said fluid to maintain said battery at a selected temperature comprises an intake manifold carrying said heating or cooling fluid to said fluid pipes in each said cradle, then out through an outlet manifold and then on through a respective at least one external heat exchanger and at least one pump, to form a closed loop heating/cooling system for said batteries in said thermally managed enclosure.

7. The battery enclosure of claim 6 wherein said intake manifold is parallel to said outlet manifold, and said intake manifold is perpendicular to said fluid pipes.

8. The thermally managed enclosure for at least one battery as in claim 1 further comprising a means for controlling the temperature of said fluid to maintain said battery in accordance with temperature requirements of said battery, said means comprising at least one heat exchanger for obtaining heating or cooling fluid from a device powered by said battery.

9. A thermally managed enclosure for at least one battery comprising;
   a) at least one cradle of thermally conductive material for containing at least one battery;
   b) said at least one cradle having at least one rectangular wall closely fitted to and in contact with said at least one battery, said wall having a first set of parallel edges and a second set of parallel edges, said second set of parallel edges being of greater length than that of said first set of parallel edges;
   c) said at least one wall of said at least one cradle having a passageway trough containing a conduit for flowing heating or cooling fluid; and
   d) said passageway trough being filled with a thermally conductive fill surrounding said tube, said passageway trough having a V-shape and said passageway trough being parallel to said second set of parallel edges.

10. The thermally managed enclosure of claim 9 having a plurality of multiple cradles for batteries, and at least one battery occupying a single cradle of said plurality of multiple cradles; wherein said sidewalls having one or more apertures and said one or more apertures are aligned in registration when assembled, said apertures being used to accommodate respective locking rods securing a respective top of each said battery to said battery enclosure.

11. The thermally managed enclosure of claim 10 wherein said battery enclosure is in the form of a monocoque battery tray formed by at least one of bonding or welding said multiple cradles at their adjacent sides.

12. The thermally managed enclosure of claim 10 in which said cradles are positioned side by side with a fluid conduit in said at least one wall of each said cradle, each said fluid conduit being in parallel with an adjacent fluid conduit, and adjacent respective cradles being attached to said at least one cradle.

13. The thermally managed system for at least one battery as in claim 9 further comprising a means for controlling the temperature of said fluid to maintain said battery at a selected temperature.

14. The thermally managed enclosure of claim 13 wherein said means for controlling the temperature of said fluid to maintain said battery at a selected temperature comprises an intake manifold carrying said heating or cooling fluid to said fluid conduits in each said cradle, then out through an outlet manifold and then on through a respective at least one external heat exchanger and at least one pump, to form a closed loop heating/cooling system for said batteries in said thermally managed enclosure.

15. The battery enclosure of claim 14 wherein said intake manifold is parallel to said outlet manifold, and said intake manifold is perpendicular to said fluid pipes.

16. The thermally managed enclosure for at least one battery as in claim 9 further comprising a means for controlling the temperature of said fluid to maintain said battery in accordance with temperature requirements of said battery, said means comprising at least one heat exchanger for obtaining heating or cooling fluid from a device powered by said battery.

17. A thermally managed enclosure for at least one battery comprising
   a) at least one cradle of thermally conductive material for containing at least one battery;
   b) said at least one cradle having at least one wall closely fitted to and in contact with said at least one battery;
   c) said at least one wall of said at least one cradle having a passageway trough containing a conduit for flowing heating or cooling fluid, and said wall having a first set of parallel edges and a second set of parallel edges, said second set of parallel edges being of greater length than that of said first set of parallel edges;
   d) said passageway trough being filled with a thermally conductive fill surrounding said tube;
   e) said cradle of thermally conductive material being a contact surface and solid transfer media transferring heating or cooling to said at least one battery; and wherein said passageway trough is parallel to said second set of parallel edges, the passageway trough having V-shaped sides, wherein a top side of the trough is co-planar with a bottom of the battery and first and second sides of the trough are below the portions of the cradle, the trough having a cross-section.

18. A thermally managed enclosure for at least one battery comprising:
   a) at least one cradle of thermally conductive material for containing at least one battery;
   b) said at least one wall of said at least one cradle having a passageway trough containing a conduit for flowing heating or cooling liquid;
   c) said at least one wall of said at least one cradle having a passageway trough containing a conduit for flowing heating or cooling liquid, said wall having a first set of parallel edges and a second set of parallel edges, said second set of parallel edges being of greater length than that of said first set of parallel edges;
   d) said passageway trough being thermally conductive and having a V-shape; and said passageway trough being parallel to said second set of parallel edges.

19. The thermally managed enclosure of claim 18 having a plurality of multiple cradles for batteries, and at least one battery occupying a single cradle of said plurality of multiple cradles; the enclosure having side walls having one or more apertures, wherein said one or more apertures are aligned in registration when assembled, said apertures being used to accommodate respective locking rods securing a respective top of each said battery to said battery enclosure.

20. The thermally managed enclosure of claim 19 wherein said battery enclosure is in the form of a monocoque battery tray formed by at least one of bonding or welding said multiple cradles at their adjacent sides.

21. The thermally managed enclosure of claim 19 in which said cradles are positioned side by side with a liquid conduit in said at least one wall of each said cradle, each said liquid conduit being parallel with an adjacent liquid conduit, and adjacent respective cradles being attached to said at least one cradle.

22. The thermally managed system for at least one battery as in claim 18 further comprising a means for controlling the temperature of said liquid to maintain said battery at a selected temperature.

23. The thermally managed enclosure of claim 22 wherein said means for controlling the temperature of said liquid to maintain said battery at a selected temperature comprises an intake manifold carrying said heating or cooling liquid to said fluid conduits in each said cradle, then out through an outlet manifold and then on through a respective at least one external heat exchanger and at least one pump, to form a closed loop heating/cooling system for said batteries in said thermally managed enclosure.

24. The battery enclosure of claim 23 wherein said intake manifold is parallel to said outlet manifold, and said intake manifold is perpendicular to said fluid pipes.

25. The battery enclosure of claim 18 wherein said working liquid is a glycol liquid solution.

26. The battery enclosure of claim 18 wherein said at least one wall of said at least one cradle is a bottom wall;
   said bottom wall of said at least one cradle having a passageway trough containing a tube for flowing heating or cooling fluid.

27. The battery enclosure of claim 18 wherein said passageway trough is V-shaped.

28. The battery enclosure of claim 18 wherein said at least wall of said one cradle includes a plurality of side walls closely fitted to and in contact with said at least one battery in said at least one cradle.

29. The battery enclosure of claim 18 wherein said passageway trough is filled with a thermally conductive fill surrounding said conduit.

30. The thermally managed enclosure for at least one battery as in claim 18 further comprising a means for controlling the temperature of said fluid to maintain said battery in accordance with temperature requirements of said battery, said means comprising at least one heat exchanger for obtaining heating or cooling fluid from a device powered by said battery.

* * * * *